United States Patent Office 3,679,648
Patented July 25, 1972

3,679,648
PREPARATION OF POLYVINYL ALCOHOL HAVING IMPROVED COLOR PROPERTIES BY TREATING THE POLYVINYL ESTER WITH AN ALKALINE EARTH METAL HYDRIDE
John E. Bristol, Niagara Falls, N.Y., assignor to E. I. du Pont de Nemours and Company, Wilmington, Del.
No Drawing. Filed Aug. 5, 1970, Ser. No. 61,466
Int. Cl. C08f 27/16
U.S. Cl. 260—91.3 PV    6 Claims

ABSTRACT OF THE DISCLOSURE

Polyvinyl alcohol having improved color characteristics is prepared in a process in which an alcoholic solution of the polyvinyl ester utilized to prepare the polyvinyl alcohol is treated with an alkaline earth metal hydride prior to the alcoholysis of the polyvinyl ester to the corresponding polyvinyl alcohol.

BACKGROUND OF THE INVENTION

Field of invention

This invention relates to a process for the preparation of polyvinyl alcohol having improved color characteristics.

Prior art

Polyvinyl alcohol is prepared by forming an alcoholic solution of a polyvinyl ester, such as polyvinyl acetate, polyvinyl propionate, or polyvinyl butyrate, and subjecting this solution to alcoholysis at temperatures of about 50° C., and higher, with the aid of an alkali metal alcoholate catalyst. This process is described in detail in U.S. Pat. 2,734,048. The process described in Pat. 2,734,048 is rapid; however, the polyvinyl alcohol produced may have poor color qualities. That is, polyvinyl alcohol produced by the process of Pat. 2,734,048 may have a yellow to tan color rather than the desired white color, and polyvinyl alcohol in the form of thin films cast from aqueous polyvinyl alcohol solutions may have a yellow to tan color rather than being a clear, colorless product.

The presence of color in the polyvinyl alcohol is troublesome in many applications. For example, polyvinyl alcohol is used as a binder in paper-making processes and as a sizing agent in knitting and weaving of various textile products. Polyvinyl alcohol is a particularly desirable textile size as a substitute for starch since waste fluids from the sizing operation containing starch are pollutants, whereas waste fluids containing polyvinyl alcohol are not pollutants. In paper-making, textile and similar applications of color-free materials are obviously desirable. Polyvinyl alcohol is also converted into products widely used in film form as a structural component in glass laminates acting to prevent the shattering of glass on impact; in such use, color-free polyvinyl alcohol is essential. Therefore, it is desirable to produce polyvinyl alcohols which will be substantially colorless in solution and when made into films for the various applications discussed above.

The prior art teaches that the color formation in polyvinyl alcohol may be due to reactions of small or trace amounts of impurities which are potential color formers, such as aldehydes or other potential chromophoric atomic groupings, which are present in the polyvinyl alcohol as the result of the alcoholysis of the polyvinyl ester with the aid of alkali metal alcoholate catalyst. It is also though that unsaturated groups found in the alcoholic solutions of the polyvinyl esters subjected to alkaline alcoholysis are color precursors and that color formation is intensified during alcoholysis by reaction through the unsaturated bonds.

Since the problem of color formation in polyvinyl alcohol is well known in the art, many attempts have been made to prepare polyvinyl alcohol which is color free and which will remain color free when utilized in many applications. The various suggestions which have been made to improve the color properties of polyvinyl alcohol generally fall into one of the following categories: pretreating the polyvinyl ester prior to alcoholysis; treatment of the polyvinyl alcohol after alcoholysis; or treatment of the polyvinyl ester as it undergoes alcoholysis.

U.S. Pat. 2,850,489, for example, teaches that pretreating an alcoholic solution of a polyvinyl ester with a strong acid, such as sulfuric acid, prior to the alcoholysis of the ester will yield a polyvinyl alcohol having much less color and improved thermal stability than is the case without acid pretreatment. This patent also teaches that various color-suppressing agents may be added to the polyvinyl ester during the alcoholysis reaction. U.S. Pat. 3,086,963 describes a process in which polyvinyl alcohol may be treated with an alkali metal borohydride such, as sodium borohydride, to improve the thermal stability of the polyvinyl alcohol. British Patent 808,108 describes a process for the production of polyvinyl alcohol in which a polyvinyl ester is alcoholyzed in the presence of an alkaline alcoholysis catalyst and a color reducing agent, such as hydrazine, hydroxylamine, butylamine, ethylene diamine, sodium borohydride, diethylmalonate, hydrogen peroxide, urea peroxide, and acetyl peroxide, agents which are said to be capable of reacting with the aldehydes thought, according to the British patent, to be color formers which are produced during the alcoholysis reaction.

It is the principal object of this invention to provide a process for producing polyvinyl alcohol having improved color properties, that is, substantially color-free polyvinyl alcohol. It is also an object of this invention to provide substantially color-free polyvinyl alcohol which can be converted into compounds such as substantially color-free polyvinyl butyral. A further object of this invention is to provide substantially color-free polyvinyl alcohol solutions which remain color-free at pH values of 7 or higher. These and other objects will be apparent as the invention is described.

SUMMARY OF THE INVENTION

The method of the present invention comprises, in the preparation of polyvinyl alcohol by the alkali metal alcoholate-catalyzed alcoholysis of an alcoholic solution of a polyvinyl ester, the improvement comprising pretreating the alcoholic solution of polyvinyl ester with from about 0.1 to about 2%, by weight, based on the weight of polyvinyl ester, of an alkaline earth metal hydride, continuing the pretreatment of the polyvinyl ester until the liberation of nascent hydrogen ceases, and then alcoholyzing the pretreated polyvinyl ester.

DETAILED DESCRIPTION OF THE INVENTION

The alkaline earth metal hydride used in pretreating the polyvinyl ester is added to the alcoholic solution of the polyvinyl ester in an amount ranging from about 0.1% to about 2%, by weight, based on the weight of polyvinyl ester in solution. In a preferred embodiment of this invention, from about 0.2% to about 1% by weight, of the alkaline earth metal hydride is added to the polyvinyl ester solution. The alkaline earth metal hydride utilized to pretreat the polyvinyl ester can be added to the polyvinyl ester solution in any form; however, it is preferred to add the alkaline earth metal hydride in the form of a finely divided powder. Useful alkaline earth metal hydrides include calcium hydride, magnesium hydride and barium hydride with calcium hydride being preferred in this process.

The alkaline earth metal hydride is preferably combined with the polyvinyl ester solutions in the presence of an acid, such as acetic acid, to convert the alkaline earth metal hydride to its corresponding acid salt thereby preventing premature alcoholysis of the polyvinyl ester due to the alkaline nature of the alkaline earth metal hydride. The acid is generally added in an amount of from about 0.3% to about 6%, by weight, based on the weight of the polyvinyl ester, although the addition of sufficient acid to convert the alkaline earth metal hydride to its corresponding acid salt is all that is required. The acid may be added to the polyvinyl ester solution prior to the addition of the alkaline earth metal hydride or simultaneously with the alkaline earth metal hydride addition, prior addition being preferred.

The alkaline earth metal hydride is combined with the polyvinyl ester solution at a temperature ranging from about 20° C. to about 150° C., preferably from about 45° C., to about 100° C., for a period of time sufficient to cause solution of the alkaline earth metal hydride in the polyvinyl ester solution, usually from about 15 minutes to one hour being sufficient. As the alkaline earth metal hydride goes into solution, it reacts with the liberation of nascent hydrogen. This provides a convenient determinent for measuring the end point of the alkaline earth metal hydride treatment, that being, cessation of the liberation of nascent hydrogen. While the pressure conditions employed may be subatmospheric or superatmospheric, especially at the higher temperatures, atmospheric pressure conditions are preferred.

It is theorized that, during the alkaline earth metal hydride treatment of the polyvinyl ester, the nascent hydrogen hydrogenates the unsaturated bonds in the polyvinyl ester thereby preventing reaction through the unsaturated bonds with resultant color formation during the subsequent alkaline-alcoholysis reaction.

The polyvinyl ester utilized in this process is derived from a carboxylic acid containing from one to four carbon atoms such as formic, acetic, propionic, and butyric acids. The polyvinyl ester, e.g. polyvinyl acetate, is treated in the form of an alcoholic solution in which the polyvinyl ester is present in a concentration of from about 20% to about 60%, preferably from about 30% to about 50% by weight, based on the combined weight of the polyvinyl ester and alcohol solvent. Suitable alcohols for the solution of the polyvinyl ester include the monohydroxy saturated aliphatic alcohols containing from one to four carbon atoms, such as methanol, ethanol, propanol and butanol, preferably methanol. After the alcoholic solution of the polyvinyl ester has been pretreated with the alkaline earth metal hydride, the alcoholysis reaction may proceed. In general, the process followed is that described in U.S. Pat. 2,734,048.

Alcoholysis is accomplished with a hydrolytic alcohol selected from the group consisting of methanol, ethanol, the mono-methyl ether of ethylene glycol and the mono-ethyl ether of ethylene glycol. Methanol is the preferred hydrolytic alcohol. Preferably, from about 1 to about 3 parts, by weight, of alcohol are employed for each part, by weight, of the polyvinyl ester employed.

The alcoholysis reaction is aided by the presence of an anhydrous alkali metal alcoholate catalyst derived from an alkanol containing from 1 to about 10 carbon atoms. The preferred catalyst is sodium methylate. The catalyst preferably is added in the form of an anhydrous alcohol solution, preferably made by reacting an alkali metal, such as sodium, with an excess of an anhydrous alcohol, e.g. methanol. Any alkali metal alcoholate may be used as a catalyst, e.g. potassium methylate, lithium butylate, sodium propylate, sodium butylate, sodium decylate, and the like. The catalyst is utilized in a concentration of from about 0.1% to about 5%, by weight, based on the weight of the reaction mixture. Preferably, from about 0.2% to about 0.5%, by weight, of sodium methylate is a satisfactory catalyst.

The alcoholysis reaction may be carried out at a temperature varying from about 20° C. to about 150° C., preferably from about 40° C. to about 100° C. While the pressure conditions used may be sub-atmospheric or superatmospheric, especially at the higher temperatures, atmospheric pressure conditions are preferred.

The alcoholysis is preferably carried out in an apparatus consisting of multiple reaction vessels connected in series such that the effluent from the first reaction vessel flows into the second reaction vessel and the effluent from the latter is treated to recover the polyvinyl alcohol therefrom. The apparatus is defined with more specificity in U.S. Pat. 2,734,048.

The polyvinyl alcohol produced by this process has improved color properties, that is, it is substantially color-free and does not develop color when subjected to either alkaline or acid treatments. By substantially color-free polyvinyl alcohol is meant polyvinyl alcohol having a color value, expressed as "percent yellow," no higher than about 5.0%, as determined with a Coleman Junior Spectrophotometer as a 4% solution of the polyvinyl alcohol in distilled water according to the method described hereinafter in Example 1.

In addition, the treatment with an alkaline earth metal hydride has no adverse effects on the other desirable qualities of polyvinyl alcohol; that is, the stability for example, of the polyvinyl alcohol is not affected by the treatment of the polyvinyl ester with an alkaline earth metal hydride. Also, the film forming properties, rate of solution, and the temperature required for solution of the polyvinyl alcohol in water are in no way adversely affected by the treatment with the alkali earth metal hydride.

The polyvinyl alcohol produced can be converted to polyvinyl butyrals by the process described in U.S. Pats. 2,358,355 or 3,153,009, the polyvinyl butyrals being exceptionally desirable as a structural component to prevent shattering of laminated glass because of its freedom from yellow color.

This invention will be more fully understood from an appreciation of the following examples which are set forth for the purposes of illustration only.

Example 1

To 3000 grams of a solution of polyvinyl acetate (45%) in methanol (55%) is added 3 grams of acetic acid and then, 0.5%, by weight, calcium hydride, based on the weight of polyvinyl acetate is added to the polyvinyl acetate solution. The mixture is agitated for 30 minutes.

Six hundred and fifty ml. of methanol and 40 grams of sodium methylate are added with agitation to a glass reactor fitted with a stainless steel paddle agitator and reflux condenser contained in a water bath heated to 55° C. After complete solution of the sodium methylate in the methanol, the calcium hydride-treated polyvinyl acetate solution is continuously added, with agitation, over an interval of 390 minutes. On completion of the polyvinyl acetate addition, an additional 30 minute interval passes after which the reaction mixture is neutralized with glacial acetic acid and then filtered through filter paper on a Büchner funnel and washed with a volume of methanol equivalent to the volume of the initial filtrate. The Büchner funnel with filter cake is covered with filter paper and placed in an oven at 40–50° C. and dried with a vacuum from a water aspirator for approximately twelve hours. The polyvinyl alcohol produced is relatively color free and is color stable at both alkaline and acid pH. The color of the polyvinyl alcohol is determined on the basis of the percent yellow which can be measured with a standard laboratory instrument such as a Coleman Junior Spectrophotometer. For example, an aliquot of the dried product is dissolved in distilled water at 90–95° C. to form a 4% solution. The color of the 4% solution at 25° C. was found to be 3.8% yellow.

The percent yellow is determined with a Coleman Junior Spectrophotometer by measuring the transmission (T) of light through the solution at wave length settings of 450, 560 and 640 A., and calculated by the equation:

$$\text{Percent yellow} = \frac{(T_{640} - T_{450}) \times 100}{T_{560}}$$

As a reference, distilled water measured under the same conditions gave a value of 0% yellow.

Example 2

Another sample of the same polymer solution used in Example No. 1 which was not treated with calcium hydride was alcoholyzed by the procedure used in Example 1. An aliquot of this product dissolved in distilled water as a 4% solution had a color of 16% yellow.

What is claimed is:

1. In the preparation of polyvinyl alcohol by the alkali metal alcoholate-catalyzed alkaline alcoholysis of an alcoholic solution of a polyvinyl ester derived from a carboxylic acid containing from 1 to 4 carbon atoms, the improvement comprising pretreating the alcoholic solution of the polyvinyl ester with from about 0.1 to about 2% by weight, based on the weight of the polyvinyl ester, of an alkaline earth metal hydride, continuing the pretreatment of the polyvinyl ester until the liberation of nascent hydrogen ceases, and then alcoholyzing the pretreated polyvinyl ester.

2. The process of claim 1 wherein the pretreatment is with from 0.2% to about 1%, by weight, of the alkaline earth metal hydride.

3. The process of claim 1 wherein the alkaline earth metal hydride is calcium hydride.

4. The process of claim 1 wherein the alkaline earth metal hydride is combined with the polyvinyl ester in the presence of from about 0.3% to about 6%, by weight, based on the weight of the polyvinyl ester, of acetic acid.

5. The process of claim 1 wherein the pretreatment is at a temperature ranging from about 20° C. to 150° C.

6. The process of claim 5 wherein the pretreatment is at a temperature of from about 45° C. to about 100° C.

References Cited

UNITED STATES PATENTS

| 2,353,355 | 9/1944 | Stamatoff | 260—32 |
| 2,734,048 | 2/1956 | Bristol et al. | 260—91.3 |
| 2,850,489 | 9/1958 | Turnbull | 260—91.3 |
| 2,862,916 | 12/1958 | Lukman et al. | 260—91.3 |
| 3,033,843 | 5/1962 | Inskip et al. | 260—91.3 |
| 3,086,963 | 4/1963 | Fusi et al. | 260—91.3 |
| 3,153,009 | 10/1964 | Rombach | 260—73 |

FOREIGN PATENTS

| 808,108 | 1/1959 | Great Britain | 260—91.3 |

JOSEPH L. SCHOFER, Primary Examiner

S. M. LEVIN, Assistant Examiner

U.S. Cl. X.R.

161—199; 260—89.1, 91.3 VA